United States Patent [19]

Mesko et al.

[11] Patent Number: 5,409,226

[45] Date of Patent: Apr. 25, 1995

[54] APPARATUS FOR PROVIDING POSITION SIGNALS

[75] Inventors: Mark S. Mesko, Valencia; Charles E. Schrader, Northbridge; Joseph O. Garlington, La Crescenta, all of Calif.

[73] Assignee: The Walt Disney Company, Burbank, Calif.

[21] Appl. No.: 69,566

[22] Filed: May 28, 1993

[51] Int. Cl.6 .......................... A63B 71/04; A63F 9/22
[52] U.S. Cl. .................................. 273/148 B; 273/438
[58] Field of Search .................... 273/148 B, 438, 313, 273/187 A, 187 B, 195 B

[56] References Cited

U.S. PATENT DOCUMENTS

| | | | |
|---|---|---|---|
| 3,169,022 | 2/1965 | Kretsinger | 273/187 R X |
| 3,352,559 | 11/1967 | Larsen | 273/187 R |
| 3,413,006 | 11/1968 | Beston | 273/187 R |
| 4,630,817 | 12/1986 | Buckley | 273/438 X |
| 4,817,950 | 4/1989 | Goo- | 273/148 B |
| 5,054,771 | 10/1991 | Mansfield | 273/438 |
| 5,195,746 | 3/1993 | Boyd et al. | 273/148 B |

Primary Examiner—Raleigh W. Chiu
Attorney, Agent, or Firm—Hecker & Harriman

[57] ABSTRACT

The present invention is an apparatus for producing position signals in response to induced pivoting motion of the apparatus by an user. The signals generated by the control device can be used to operate computer systems, entertainment systems, and automated processes. A circular contact disk is coupled to a suspension block that includes a universal joint allowing the contact disk to pivot in 360°. The suspension block comprises a pneumatic spring for providing continuous suspension of the contact disk in response to motion of the contact disk. The suspension block further comprises dampers for providing continuous damping in response to motion of the contact disk. Also, the suspension block comprises stop cylinders for stabilizing the contact disk in a reference state. Transducers coupled to the contact disk generate position signals in response to motion of the contact disk. A chassis is coupled to the suspension block, thereby supporting the input mechanism. The contact disk includes a steering fixture perpendicularly disposed to a surface of the contact disk for facilitating pivotal motion. The chassis comprises an upper and lower chassis. Compliant pivots couple the upper chassis to the lower chassis, thereby allowing rotation of the upper chassis in a direction perpendicular to a supporting surface. The system further comprises an air cylinder coupled between the upper chassis and lower chassis for vertically displacing the upper chassis. The air cylinder is also used to weigh the user.

20 Claims, 10 Drawing Sheets

APPARATUS FOR PROVIDING POSITION SIGNALS

BACKGROUND OF THE PRESENT INVENTION

1. Field of the Invention

This invention relates to the field of devices for providing position signals.

2. Background Art

A number of amusement or entertainment devices have been provided that permit an operator to manipulate a machine or vehicle using a control apparatus to produce real or simulated motion. Typically, a joystick or similar manual device is used to produce position (or control) signals to operate the simulation machine. Electrical motors, hydraulic pumps, etc. produce motion such as flying and/or driving in the simulation machine. Typically, the simulation device comprises a cockpit enclosing a seat, control apparatus, and viewing monitor. The user sits or reclines in the cockpit while observing the monitor and operates the simulation machine using the joystick. The signals generated by the joystick produce motion and/or action in the computer-generated activities displayed on the monitor. The signals are also provided to the motors, hydraulic pumps, etc. to produce motion in the simulation machine.

In such applications, a joystick typically provides two analog values from transducers as well as "fire" signals from buttons incorporated in the joystick. The two analog values represent orthogonal position coordinates. Typically, a joystick device comprises two potentiometers, one for each axis of an X-Y coordinate system, connected to a lever, or other operable device, that is physically manipulable by the user. The resistance of each potentiometer is continuously variable and is determined by the position of the fixture along each axis. Thus, a user may generate position signals by manually adjusting a lever with respect to a reference position. The resistances of the potentiometers are varied accordingly. The variable resistances of the joystick may be used either directly or indirectly to produce corresponding position signals. For instance, joysticks used in personal computer applications typically couple the potentiometers of the joysticks to capacitors. The joystick is used to adjust the time constant of an RC circuit. The time constant is measured to determine displacement and correspondingly position.

In amusement and entertainment systems using the above-cited joysticks (or similar devices), simulation machine motion is produced in response to joystick signals. A number of such prior art systems have been disclosed.

A video simulation machine for simulating various movements, such as flying or driving, is described in U.S. Pat. No. 4,856,771 issued to Nelson, et al. on Aug. 15, 1989. The machine comprises a simulated cockpit of an airplane or other vehicle wherein one or two persons may recline or be seated containing movement controls and a monitor for displaying simulated pictures responsive to the movement controls. The controls include a joystick control and a foot control. The machine simulates movements including simultaneous pitch, roll, and yaw as well as ascent and descent. The rotating parts of the simulator are driven by electric motors that are controlled by both the operator and a computer. This video simulation machine does not produce position signals in direct response to induced pivoting motion of the apparatus by an essentially standing operator upon the apparatus.

A simulation machine for movement in one or more senses is described in U.S. Pat. No. 4,710,129 issued to Newman, et al. on Dec. 1, 1987. The machine comprises a cabin wherein a person may recline or be seated. The cabin contains a joystick for controlling cabin movement, one or more motors for producing cabin movement, a monitor for displaying images, sensors for sensing cabin movement, and one or more CPUs for changing the monitor display in response to the cabin movements. The cabin is suspended in the arms of an upstanding yoke mounted for rotational movement. The rotating parts of the simulation device are driven by electric motors that are controlled by the joystick and sensors. However, this simulation machine does not produce position signals in direct response to induced pivoting motion of the apparatus by an essentially standing operator upon the apparatus.

A monitor game machine for simulating various movements of an airplane or car is described in U.S. Pat. No. 4,478,407 issued to Manabe on Oct. 23, 1984. The monitor game machine comprises a cockpit or driver cabin wherein a player is seated. The cabin contains a monitor and a steering device operated by the player in response to picture displayed on the monitor. The monitor game machine is characterized in that the cockpit inclines backward and forward, as well as right and left in response to the steering device. The steering device produces movement in the monitor game machine by controlling solenoid valves that regulate oil pumped by a hydraulic pump to hydraulic cylinders. However, this monitor game machine does not produce position signals in direct response to induced pivoting motion of the apparatus by an essentially standing operator upon the apparatus.

A video controlling and viewing system is described in U.S. Pat. No. 4,461,470 issued to Astroth, et al. on Jul. 24, 1984. The system comprises a platform supporting a chair that seats a user and a video screen. A control device such as a joystick is used to move and to rotate images on the video screen of the console as well as tilt the platform opposite to the direction of movement on the video screen. The platform is tilted by a driving means comprising cables, a drum and a motor. The video controlling and viewing system does not produce position signals in direct response to induced pivoting motion of the apparatus by an essentially standing operator upon the apparatus.

An interstellar space illusion device is described in U.S. Pat. No. 2,935,316 issued to Bradstreet on May 3, 1960. The device creates the illusion of interstellar space travel wherein a plurality of lights representing stars move in a manner that simulates movement through space. The illusion device comprises a hollow body containing a seat for a user. The hollow body is provided with a spring suspension that allows the user to rock the space illusion device. However, this interstellar space illusion device does not produce position signals in direct response to induced pivoting motion of the apparatus by an essentially standing operator upon the apparatus.

None of the prior art schemes provides an apparatus for producing position signals in direct response to induced pivoting motion of the apparatus by an operator standing upon the apparatus. Thus, none of the prior art systems provides a device that simulates the effects and motions of a hovering machine, surfing, skiing, etc. in order to produce position signals in response to shifts in user body weight, motion, position and/or physical disposition.

SUMMARY OF THE PRESENT INVENTION

The present invention relates to the field of devices for providing position signals. In particular, an apparatus for producing position signals in response to induced pivoting motion of the apparatus by an user upon the apparatus is disclosed. The signals generated by the control device are used to operate such systems as, for example, computer systems, entertainment systems, and automated processes.

The present invention provides position signals in response to induced motions upon a contact means. The contact means is coupled to a suspension means that allows pivotal motion of the contact means. The suspension means comprises a universal joint that allows the contact means to tilt, or pivot, from a reference plane plane having orthogonal X and Y axes. The contact means is free to tilt, or pivot, in 360° direction about a third axis perpendicular to the reference plane defined by the X and Y axes. Transducing means are coupled to the contact means for providing position signals in response to motion of the contact means. A chassis is coupled to the suspension means, thereby supporting the input mechanism. The suspension means also comprises a pneumatic (tubular air) spring for providing continuous suspension of the contact means in response to motion of the contact means.

Transducing means comprising a plurality of potentiometers measures displacement of the contact means from a reference plane. Each potentiometer of the plurality of potentiometers has a variable resistance that is responsive to the pivotal motion of the contact means. The contact means includes a steering fixture perpendicularly disposed to a surface of the contact means for facilitating pivotal motion and giving rider stability. The suspension means comprises a restoring force to the contact means and damping means for providing continuous damping in response to motion of the contact means. Also, the suspension means comprises stopping means for stabilizing the contact means in a reference state and limits the pivotal motion during operation.

The chassis comprises an upper and lower chassis. Compliant pivotal means couple the upper chassis to the lower chassis, thereby allowing rotation of the upper chassis in a direction perpendicular to a supporting surface. The system also comprises an air cylinder coupled between the upper chassis and lower chassis for vertically displacing the upper chassis. "Bumps" are produced to the upper chassis in response to air bursts applied to the air cylinder through a pneumatic valve. The air cylinder is also used to weigh the user.

DETAILED DESCRIPTION OF THE PRESENT INVENTION

A method and apparatus for providing position signals is described. In the following description, numerous specific details, such as number and nature of pivots, struts, air cylinders, etc. are described in detail in order to provide a more thorough description of the present invention. It will be apparent, however, to one skilled in the art, that the present invention may be practiced without these specific details. In other instances, well-known features are not described in detail so as not to unnecessarily obscure the present invention.

The present invention is a control device that generates position and/or control signals responsive to user manipulations. The signals generated by the control device are used to operate such illustrative systems as computer systems, entertainment systems, automated processes, etc.

Figure 8:
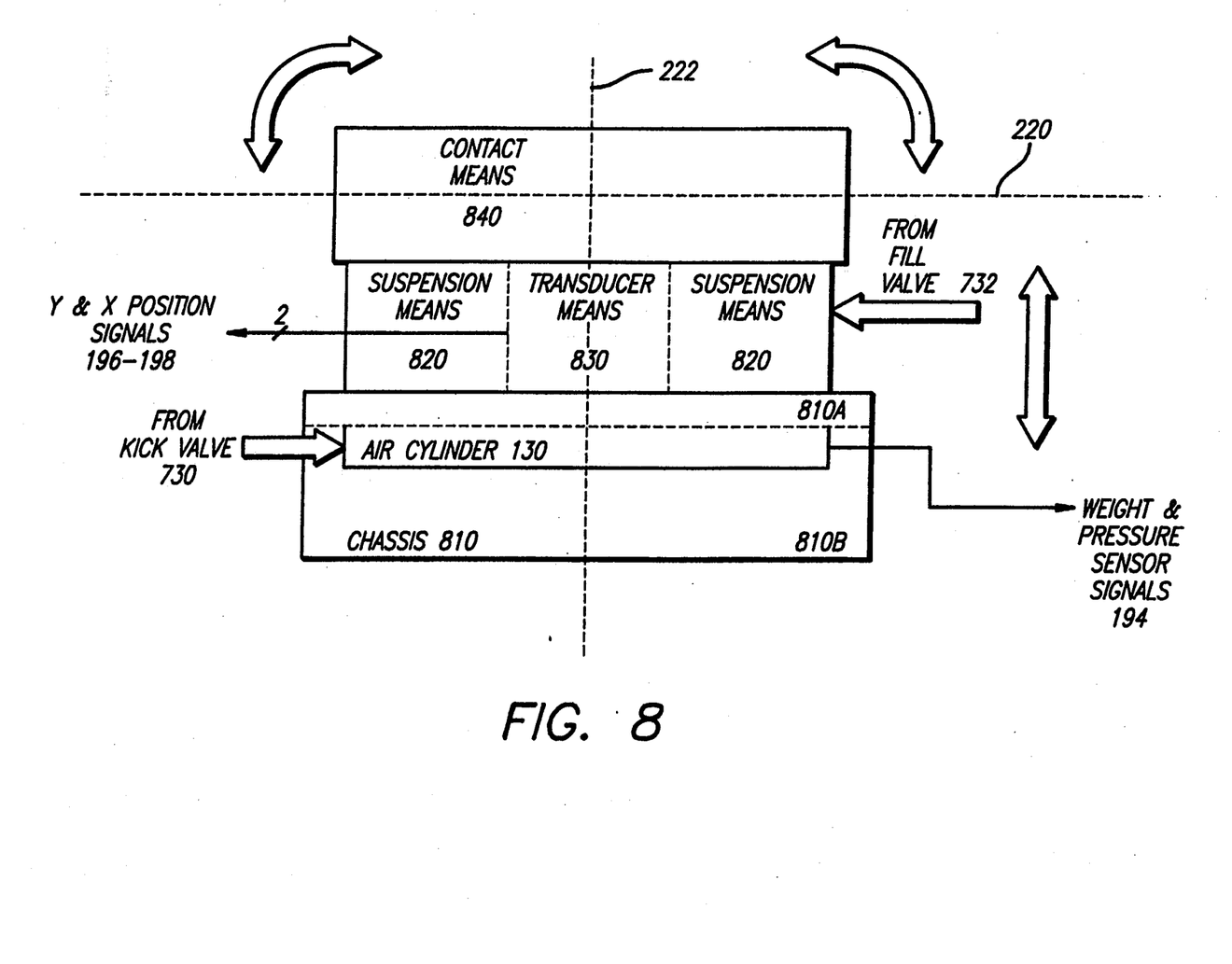
FIG. 8 is a high-level schematic of the present invention

FIG. 8 is a high-level schematic of the present invention for providing position signals in response to induced motions upon a contact means 840. The contact means 840 is coupled to a suspension means 820 that allows pivotal motion of the contact means 840. In the preferred embodiment, the suspension means 820 comprises a universal joint that allows the contact means to tilt, or pivot, from a reference plane plane having orthogonal X and Y axes. The contact means 840 is free to tilt, or pivot, in 360° direction about a third axis perpendicular to the reference plane defined by the X and Y axes. Transducing means 830 are coupled to the contact means 840 for providing Y- and X-position signals 198–196 in response to motion of the contact means 840. A chassis 810 is coupled to the suspension means 820, thereby supporting the suspension means 820, transducer means 830, and contact means 840. In the preferred embodiment, the suspension means 820 also comprises a pneumatic (tubular air) spring for providing continuous suspension of the contact means 840 in response to motion of the contact means 840 in addition to a restoring force which causes the contact means to try to return to a reference plane 220.

In the preferred embodiment, transducing means 830 comprises a plurality of potentiometers that measure displacement of the contact means 840 from a reference plane 220. Each potentiometer of the plurality of potentiometers has a variable resistance that is responsive to the pivotal motion of the contact means 840. The contact means 840 may include a steering fixture perpendicularly disposed to a surface of the contact means 840 for facilitating pivotal motion. In the preferred embodiment of the present invention, the suspension means 820 comprises damping means for providing continuous damping in response to motion of the contact means 840. Also, the suspension means 820 comprises stopping means for stabilizing the contact means 840 in a reference state defined by plane 220 and vertical axis 222.

The chassis 810 may comprise an upper and lower chassis 810A–810B. The upper chassis 810A is coupled to the lower chassis 810B so that a degree of freedom exists in a direction perpendicular to a supporting surface (indicated by vertical axis 222). The system also comprises an air cylinder 130 coupled between the upper chassis 810A and lower chassis 810B for vertically displacing the upper chassis 810A. Non rider-induced "bumps" are produced by the air cylinder 130 to the upper chassis 810A in response to air bursts applied to the air cylinder 130 through a pneumatic valve 730. The air cylinder 130 is also used to weigh the user, thereby producing weight and pressure sensor signal 194.

Figure 1A:
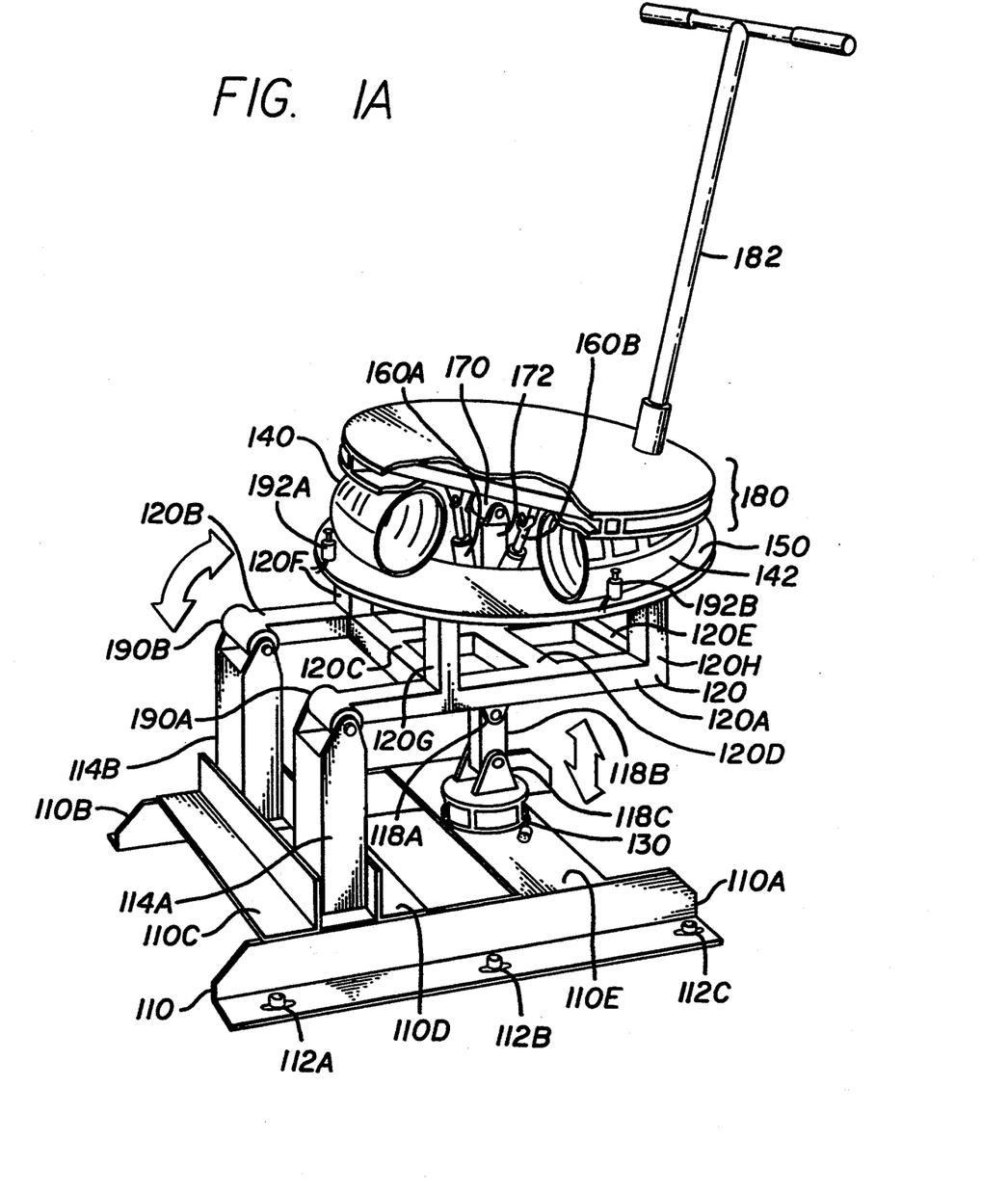
FIGS. 1A–1B are diagrams illustrating perspective and side views of the preferred embodiment of the present invention, respectively.

FIG. 1A is a detailed diagram of the preferred embodiment of the present invention comprising upper platform 180, universal-joint (U-joint) pivot 170, air spring 140, hydraulic dampers 160A–160B, chassis 110–120, and air cylinder 130. The upper platform 180 is essentially a circular disk. Lower chassis 110 is affixed to a supporting surface by fasteners 112A–112F comprising nuts and bolts secured in the supporting surface. The lower chassis 110 (herein also referred to as the base frame) is an essentially rectangular frame comprising longitudinal frames 110A–110B and lateral frames 110C–110E. Lower chassis 110 further comprises at least two struts 114A–114B that are perpendicularly mounted with respect to the supporting surface and frames 110A–110E. Struts 114A–114B are secured by lateral frames 110C–110D. Upper chassis 120 is coupled by compliant pivot mounts 190A–190B to the distal ends of struts 114A–114B of lower chassis 110 from the supporting surface, respectively. Compliant pivot mounts 190A–190B provide a degree of freedom for upper chassis 120 to rotate in a vertical direction about an axis passing through the centers of compliant pivots 190A and 190B.

Figure 5:
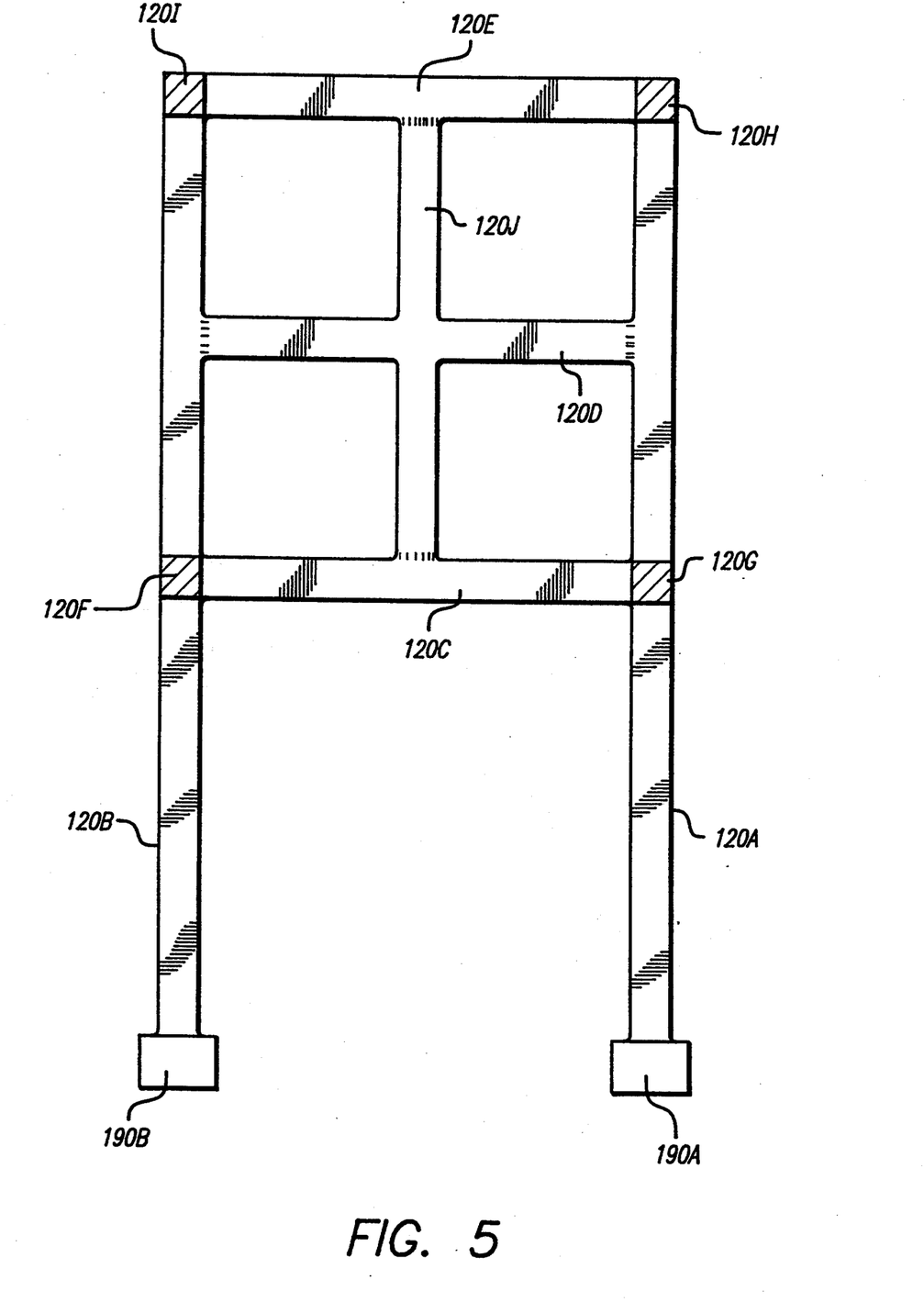
FIG. 5 is a top-view diagram of the upper chassis of the present invention.

FIG. 5 is a top-view diagram of upper chassis 120 comprising longitudinal frames 120A–120B that extend in parallel from compliant pivot mounts 190A–190B. Upper chassis 120 also comprises lateral frames 120C–120E that are connected between longitudinal frames 120A–120B. Lateral frames 120C–120E are positioned approximately one quarter of the longitudinal length of upper chassis 120 apart beginning at the distal end from compliant pivot mounts 190A–190B. A longitudinal frame 120J extends from the center of lateral frame 120E to the center of lateral frame 120C, thereby intersecting lateral frame 120D. Upper chassis 120 further comprises vertical frames 120F–120I that are mounted on the top surface of chassis 120. Vertical frames 120F–120G are located at the intersections of longitudinal frames 120A–120B with lateral frame 120C. Similarly, vertical frames 120H–120I are located at the intersections of longitudinal frames 120A–120B with lateral frame 120E. The upper chassis 120 may be fabricated by molding the entire structure, welding together the cited components, or some combination thereof. FIG. 1A provides a perspective-view of upper chassis 120.

In FIG. 1A, a first surface of air cylinder 130 is centrally mounted on lateral frame 110E of lower chassis 110. The second surface of air cylinder 130 is coupled to lateral frame 120D of upper chassis 120 by compliance pivot strut assembly 118. Assembly 118 comprises a strut 118B having clevises 118A and 118C at each end.

The lower clevis 118C of assembly 118 is coupled to the second surface of air cylinder 130. The upper clevis 118A of assembly 118 is centrally coupled to the bottom surface of lateral frame 120D of chassis 120.

The bottom surface of annular base 150 is secured to four vertical frames 120F–120I of chassis 120 that extend upwards. Annular base 150 is centrally aligned over vertical frames 120F–120I so that the inner aperture 150A of annular base 150 is concentric with a strut 172 disposed therein. A first end of strut 172 is fixedly attached to lateral frame 120D of upper chassis 120. The second end of strut 172 is coupled to a bottom surface of upper platform 180 (circular disk) by means of U-joint 170. Universal joint 170 provides upper platform 180 with three degrees of freedom. The upper platform 180 tilts, or pivots, due to U-joint 170 about axes perpendicular to the longitudinal axis concentric with strut 172. This provides 360° of pivoting motion for upper platform 180.

In the preferred embodiment, two hydraulic dampers 160A–160B are disposed about strut 172 as shown in FIG. 1A. First ends of hydraulic struts 160A–160B are attached to chassis 120. Second ends of hydraulic struts 160A–160B are attached to upper platform 180. The hydraulic dampers 160A–160B provide 50% of damping in compression and 50% of damping in extension. This valving provides the same amount of downward resistance as it does upward resistance. Therefore, only two hydraulic dampers 160A–160B are required instead of four, thereby reducing the number of components in the system. Opposite hydraulic dampers 160A–160B are linear transducers 162A–162B (not shown in FIG. 1A), respectively. Linear transducers 162A–162B are described below. Hydraulic dampers 160A–160B and linear transducers 162A–162B are each coupled to upper platform 180 by clevises, or similar hinged devices, that provide two degrees of freedom for pivoting motion of upper platform 180.

Figure 1B:
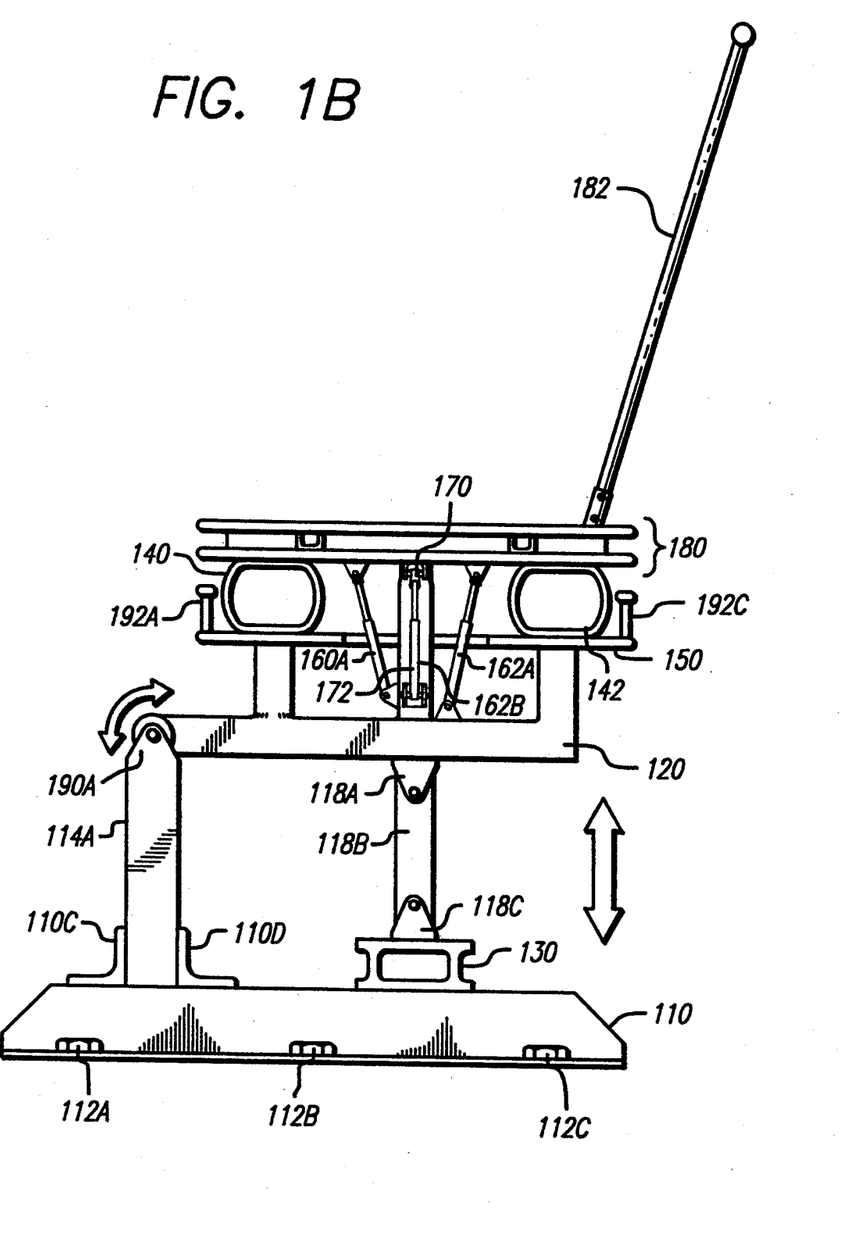
Figure 3:
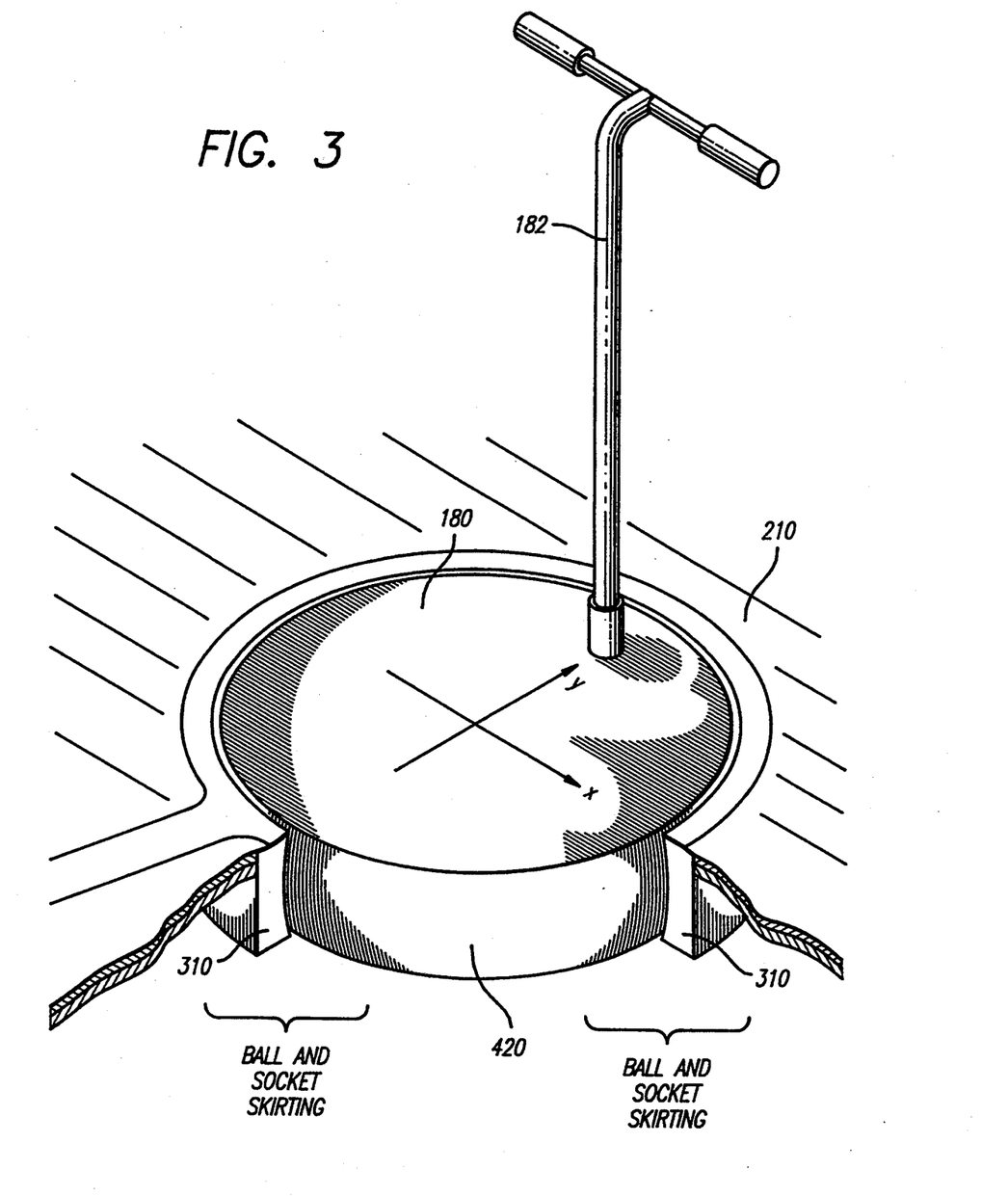
FIG. 3 is a perspective diagram of the present invention illustrating ball-and-socket skirting incorporated in the present invention.
Figure 6A:
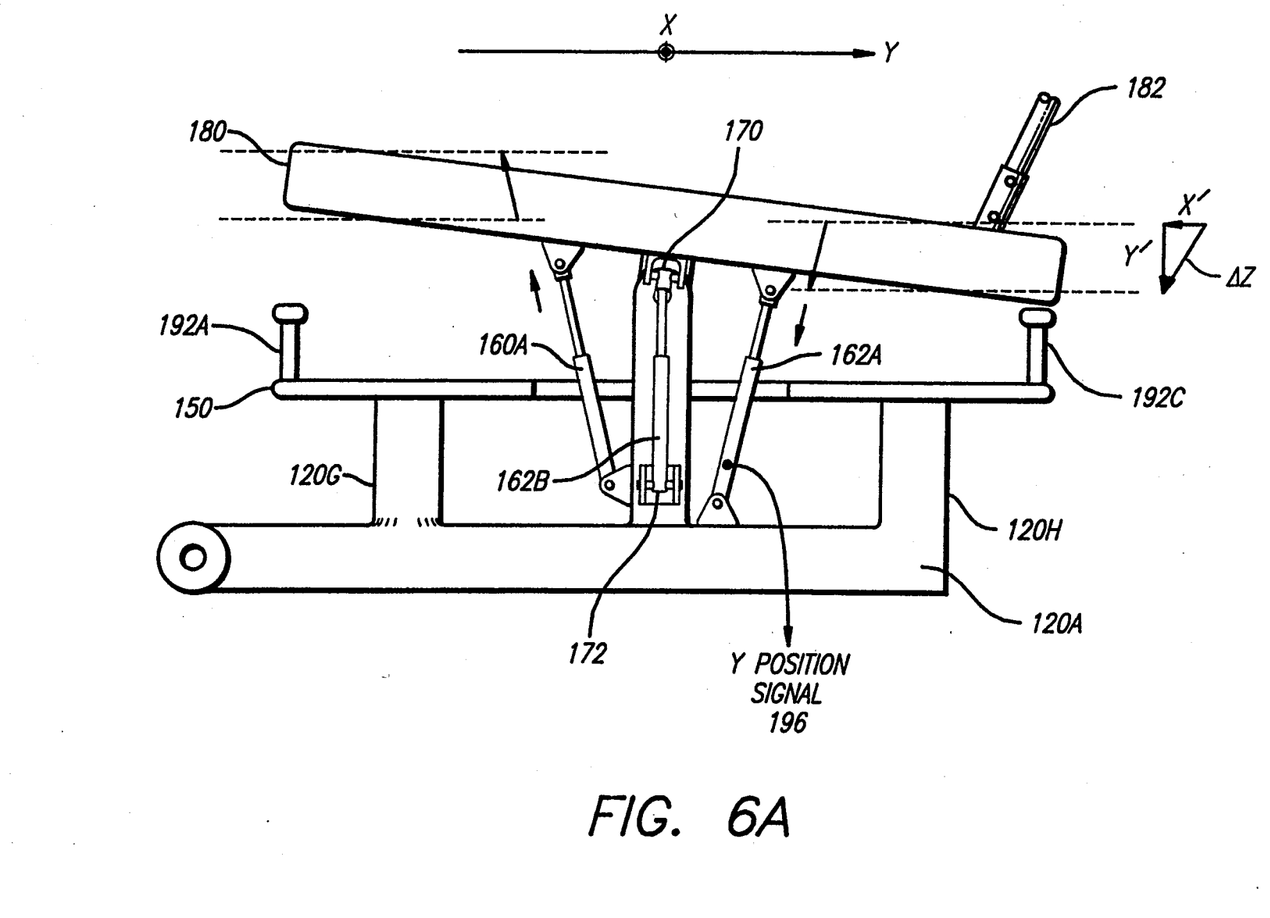
FIGS. 6A–6B are cutaway diagrams of the side and front views of the present invention illustrating displacement of the upper platform 180 in the Y and X directions, respectively.
Figure 6B:
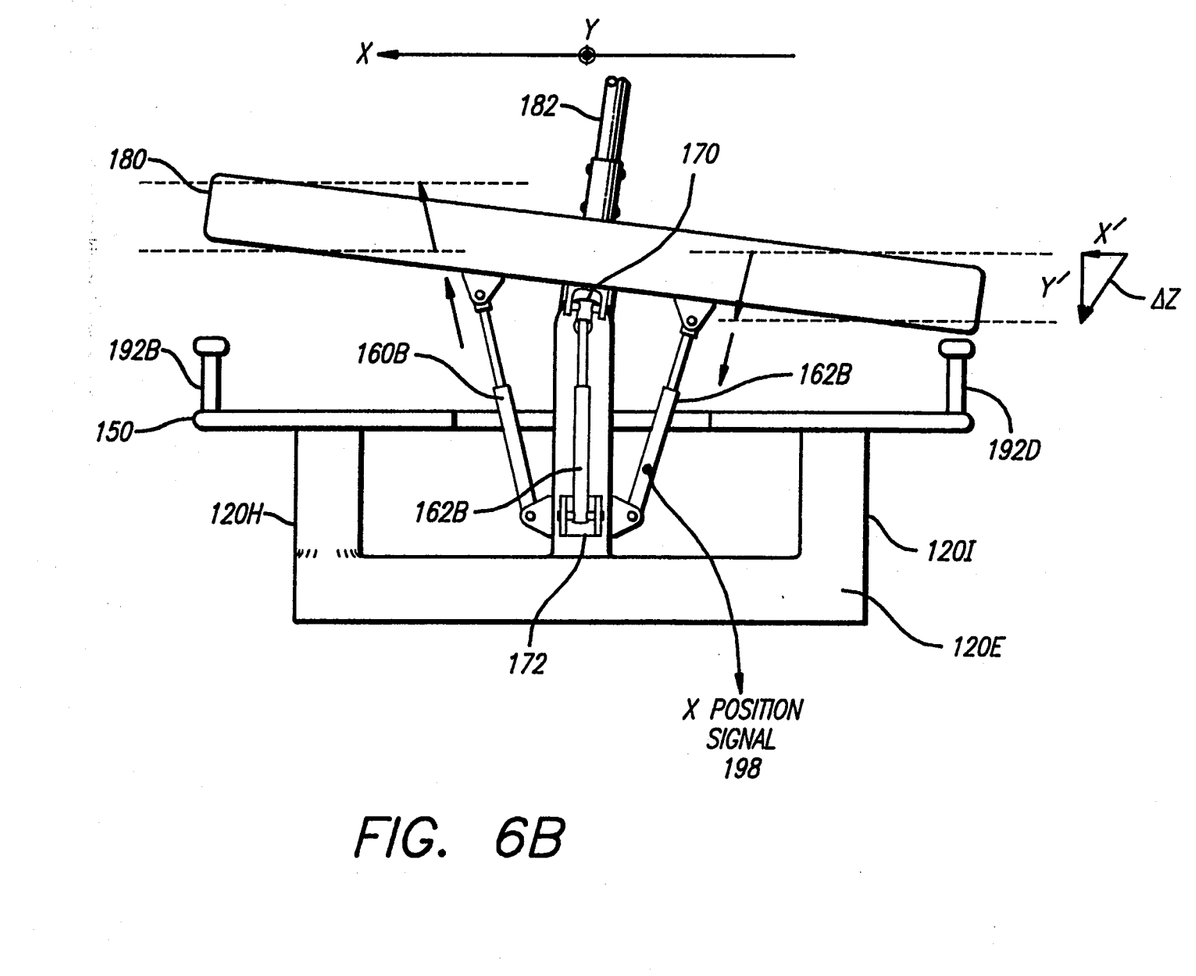

In FIGS. 1A–1B, upper platform 180 comprises upper and lower disks 180A and 180C, respectively. A steel frame 180B is disposed within the two disks 180A and 180C to provide structural support for loading of upper platform 180. In FIGS. 3 and 6A–6B, upper platform 180 is illustrated as a single or solid circular disk.

In FIGS. 1A–1B, a pneumatic spring 140 is positioned between annular base 150 and upper platform 180 so that pneumatic spring 140 is concentrically aligned with annular base 150. In the preferred embodiment, pneumatic spring 140 comprises either a heavy, rubber tube such as is used in vehicle bumpers or a tractor tire tube. Pneumatic spring 140 may be variably inflated to accommodate various sizes of riders; however, it is typically inflated with a fixed quantity of air. FIGS. 1A–1B illustrate that pneumatic spring 140 is contained within a pneumatic spring housing 142 that is in contact with base 150. Pneumatic spring housing 142 is essentially toroidal in shape and is comprised of plastic or other material resistant to abrasion. Pneumatic spring 140 has a closed valve for normal operation, thereby maintaining constant air pressure. However, a fill valve may be used to maintain constant pressure in response to control signals from a control/interface 710 illustrated in FIG. 7. The pneumatic spring 140 provides smooth, continuous suspension of upper platform 180 in response to user input motion in addition to providing a restoring force to help bring the upper platform 180 back to the neutral position.

Equally spaced along the outermost periphery of annular base 150 are four bump-stop air cylinders 192A-192D attached thereto. FIG. 1A and 1B illustrate bump-stop air cylinders 192A-192B and 192A-192C, respectively. The bump stop cylinders 192A-192D, when in retracted positions, limit the maximum displacement of circular disk 180 in a downward direction with respect to a reference plane (shown in FIG. 4 and described below). As shown in FIGS. 1A-1B, pneumatic spring housing 142 is a half toroid wherein the cross-sectional height of the toroid is less than the height of bump-stop air cylinders 192A-192D in their retracted positions. Thus, maximum vertical displacement of the upper platform 180 does not cause upper platform 180 to impinge upon the pneumatic spring housing 142.

A steering mechanism 182 shown in FIGS. 1A-1B is mounted on the top surface of upper platform 180. The steering mechanism 182 is mounted to the top surface of upper platform 180 at a radial position near the periphery of upper platform 180. In the reference state of upper platform 180, the steering mechanism 182 is located at a position that is furthest from compliant pivot mounts 190A-190B along an axis parallel to longitudinal frames 110A-110B of lower chassis 110. In the preferred embodiment, the steering mechanism is canted forward, as illustrated in FIG. 1B, to prevent a user from colliding with it when a "bump" is produced by air cylinder 130 and to allow knee clearance.

FIG. 1B is a side-view diagram illustrating a cross-section of the present invention. The angle of rotation for upper chassis 120 is shown due to compliant pivot mounts 190A-190B. Compliant pivot mounts 190A-190B facilitate vertical displacement of upper chassis 120 when air cylinder 130 expands or contracts. The vertical extension or compression of air cylinder 130 is translated to upper chassis 120 by strut assembly 118A-118C. Air cylinder 130 further comprises cushions, as is well-known in the art, for reducing jarring effects to the upper chassis 120 when the piston strikes the air cylinder's internal base.

In FIG. 1B, a first end of strut 172 is rigidly attached to upper chassis 120. The strut 172 extends upward through the concentrically aligned arrangement of base 150, pneumatic spring housing 142, and pneumatic spring 140. The center of strut 172 is shown to be collinear with the centers of strut assembly 118A-118C and air cylinder 130 when in a reference position for the system (see FIG. 2 below). The second end of strut 172 is coupled to upper platform 180 by means of U-joint 170 described previously. In FIG. 1B, hydraulic damper 160A is coupled on the left side of strut 172 between upper platform 180 and strut 172. Opposite hydraulic damper 160A on the right side of strut 172 is linear transducer 162A. Linear transducer is coupled between upper chassis 120 and upper platform 180 for measuring displacement of upper platform 180 in response to user input motion. Although not shown in FIG. 1B, a second hydraulic damper 160B is attached on the facing side of strut 172 to upper platform 180. Similarly, a second linear transducer 162B is coupled between the upper chassis 120 and upper platform 180 on the back side of strut 172 opposite to hydraulic damper 160B. Linear transducers 162A-162B measure linear compression and extension about the X and Y axes of the upper platform.

Figure 2:
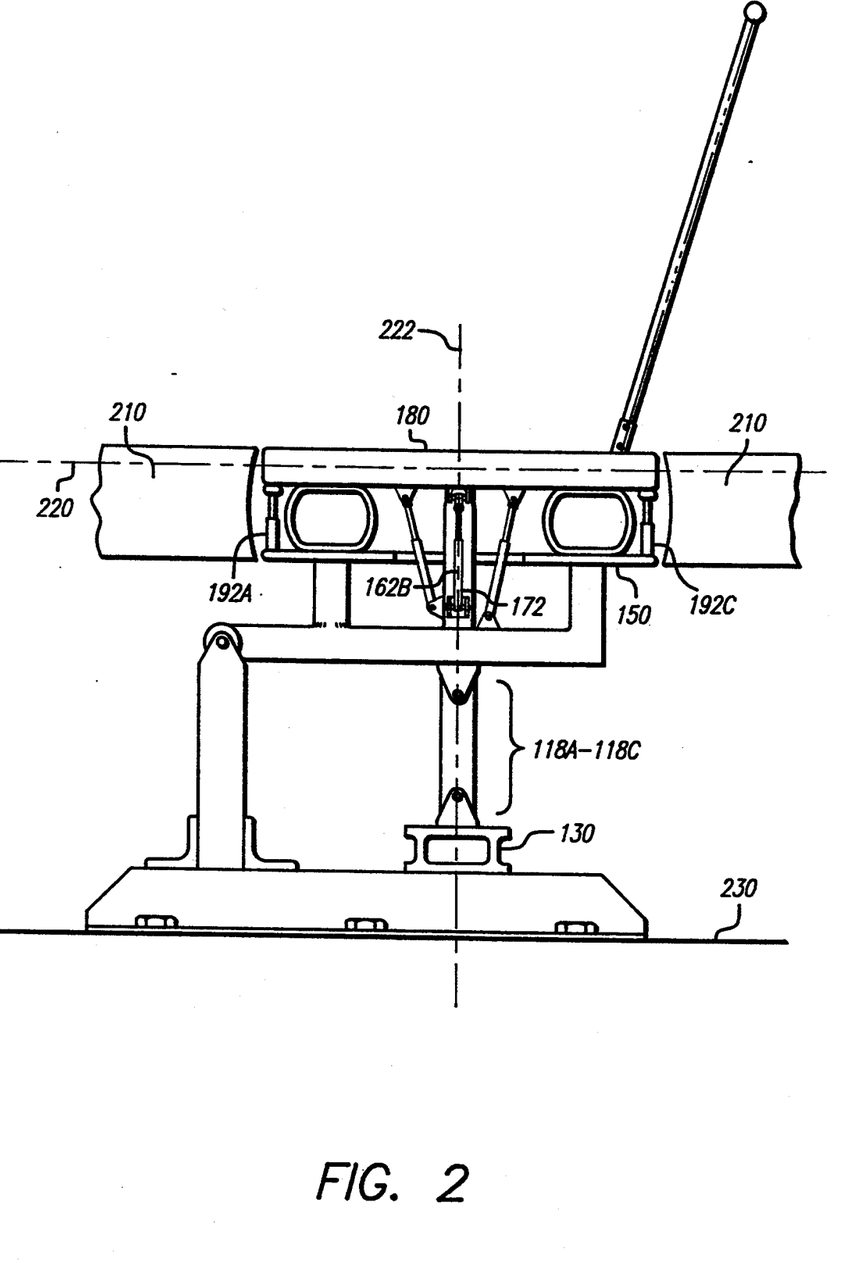
FIG. 2 is a side-view diagram of the present invention illustrating a reference plane when air cylinders 192A–192D are extended.

FIG. 2 is a side-view diagram of the system disposed on supporting surface 230, as shown in FIG. 1B, wherein the reference plane 220 and vertical axis 222 of the reference state are defined. Reference plane 220, denoted by a dash-dot line, intersects upper platform 180 and is defined with respect to base 150. The top surface of upper platform 180 is shown to be flush with the surrounding surface 210 so that upper platform 180 and surrounding surface 210 form a smooth surface. In the reference state, base 150 and reference plane 220 are parallel to frames 20A-120E. The reference plane 220 intersects upper platform 180. Similarly, a vertical axis 222 is illustrated by a dashed line concentric to strut assembly 180A-180C and strut 172 in the reference plane. Bump-stop air cylinders 192A-192D are affixed to base 150 proximal to the outer radial edge. In FIG. 2, air cylinders 192A and 192C are illustrated in an extended position; similarly, air cylinders 192B and 192D are also extended, but are not shown in the diagram. This stabilizes upper platform 180 so that a user may safely mount upper platform 180.

FIG. 3 is a cut-away view of the ball-and-socket skirting 310 surrounding upper platform 180. Again, the upper platform 180 and surrounding surface 210 form a smooth surface. A reference coordinate system for defining user input motion is illustrated wherein the X- and Y-axes are formed along the lateral and longitudinal axes of the system, respectively. The reference coordinate point of (0, 0) is centered at the location where vertical axis 222, that is concentric with strut 172 in FIG. 2, intersects the reference plane 220. Thus, the Y-axis increases positively in this coordinate system in the direction of steering mechanism 182.

Figure 4:
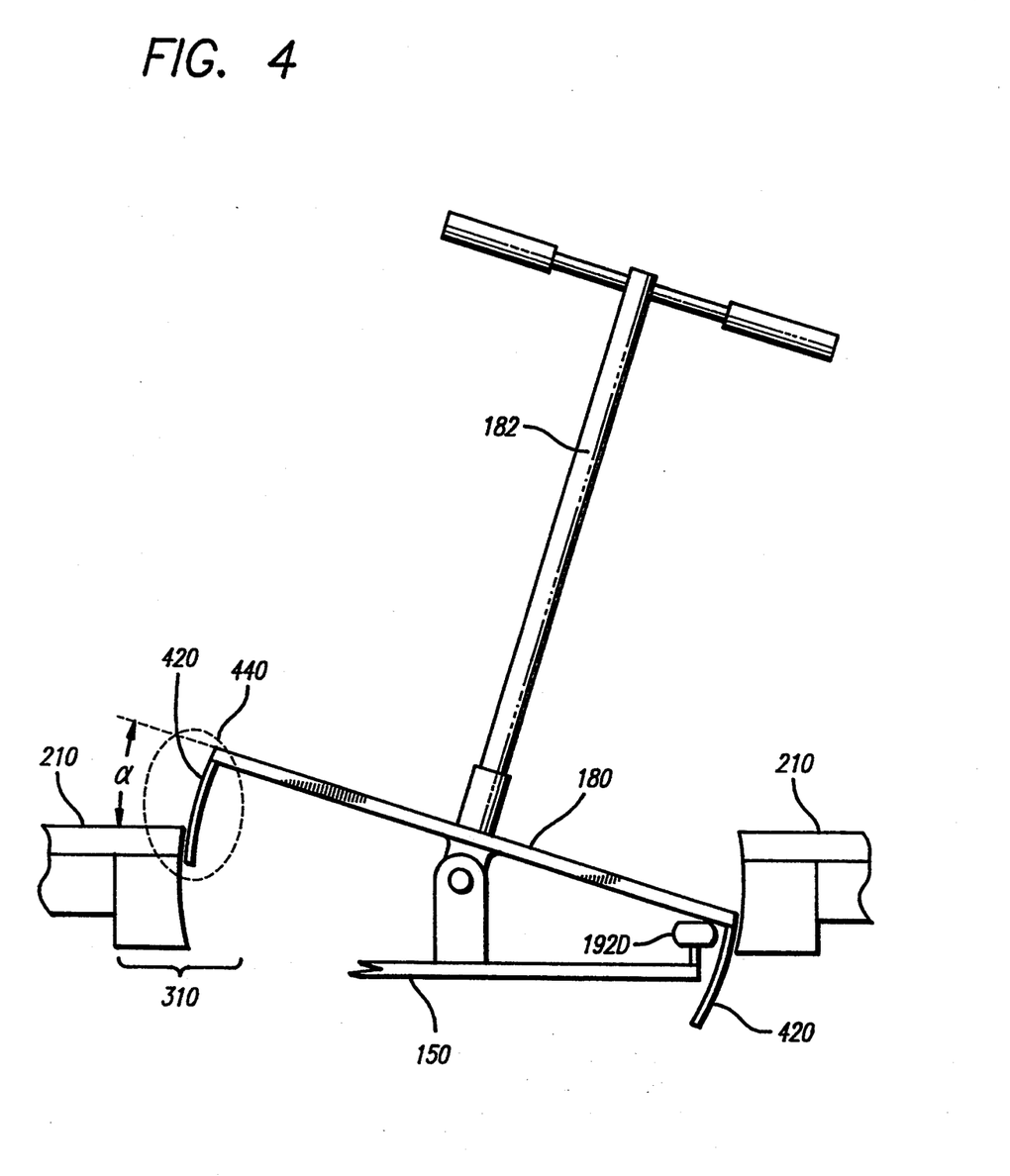
FIG. 4 is a front-view diagram of the present invention that illustrates pivoting motion of the system in the ball-and-socket skirting.

In FIG. 3, cladding 420 surrounds upper platform 180 and extends downward to enclose base 150 and the intervening components. The cladding 420 is a safety feature formed of a semi-rigid material (i.e., plastic) so that it provides a curved, complementary surface for ball-and-socket skirting 310. FIG. 4 is a diagram illustrating disturbance of upper platform 180 from the reference state. In the diagram, upper platform 180 is displaced downward essentially in the negative X direction of the reference coordinate system (toward the right as shown). This causes the bottom surface of upper platform 180 to extend above the top surface of surrounding surface 210. In this position, cladding 420 provides a safety feature to prevent objects being placed within the gap (indicated by dashed circle 440) formed therewith. The diagram also illustrates that for all maximum displacements (formed when upper platform 180 impinges upon bump-stop air cylinders 192A-192D) identified by angle $\alpha$, cladding 420 extends down into ball-and-socket skirting 310 below the surrounding surface 210.

Figure 7:
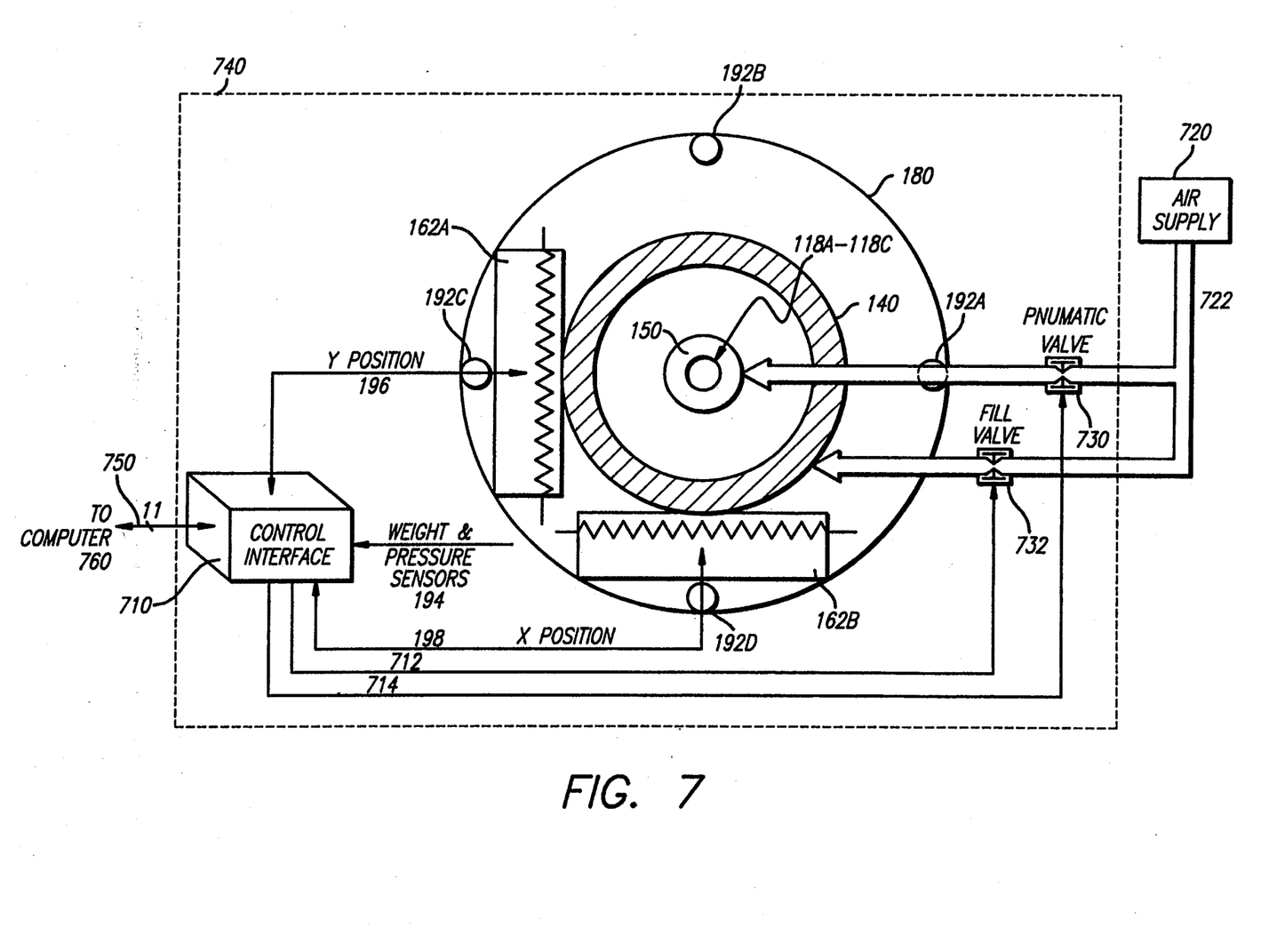
FIG. 7 is a top-view diagram of the present invention illustrating signals produced by and provided to the system.

Initially, when the system is in the load state as shown in FIG. 2, the four air cylinders 192A-192D around the perimeter of the base 150 are in the up position. This stabilizes the upper platform 180, and, thus, a user is able to safely mount the system. While in the load state, the user is weighed by the system. Although the upper platform 180 is held in position relative to the base 150 by the bump-stop air cylinders 192A-192D, the upper chassis 120 still has a degree of freedom relative to lower chassis 110. The weight of the user upon the upper platform 180 creates a downward vertical force upon air cylinder 130 through strut assembly 118A-118C. Compliant pivot mounts 190A-190B are the mechanism facilitating the transfer of this downward force to strut assembly 118A-118C. The downward force translated through strut assembly 118A–118C compresses air cylinder 130 that contains a known quantity of air. Linear pressure transducers incorporated in air cylinder 130 measure the linear displacement or position of air cylinder 130 due to compression. In FIG. 7, the measurement is used to determine the weight of the user from a lookup table using a computing means. For example, a measurement of one quarter inch produced by the linear transducers corresponds to an entry of one hundred pounds in the lookup table. Similarly, a measurement of one half inch indexes two hundred pounds in the same lookup table.

FIG. 7 provides an overview of the present invention indicated by dashed box 740. The diagram provides a top-view of the system 740 comprising upper platform 180, linear transducers 162A–162B, air cylinder 130, and pneumatic spring 140. Linear transducers 162A–162B produce Y- and X-position signals 196–198, respectively, that are provided to control interface 710. Control interface 710 also receives weight and pressure signals 194 from air cylinder 130. The control interface 710 provides a fill signal 712 and a kick signal 714 to fill valve 732 and pneumatic valve 730, respectively. Pneumatic valve 730 controls air flow 722 to air cylinder 130 from air supply 720. Similarly, fill valve 732 controls air flow 722 from air supply 720 to bump-stop air cylinders 192A–192D (coupling of air flow 722 from fill valve 732 to bump stop cylinders 192–192D not shown) that are located along the periphery of base 150 adjacent to pneumatic spring 140.

The control interface 710 transfers Y- and X-position signals 196–198 has well as weight and pressure sensor signals 194 to computer 764 through communicating channel 750. In the preferred embodiment of the present invention, communication channel 750 is an RS232/RS432 serial communication link comprising 11 signal lines. However, it is within the scope of the present invention to transfer the signals using other hard-wired communication links including a parallel bus. In yet another application, the control interface 710 may transmit and receive modulated communication signals (such as AM and FM radio signals) to and from a remotely, controlled apparatus or computer. Thus, communication channel 750 may be an AM/FM communications channel.

Pneumatic valve 730 in FIG. 7 produces a "bump" in the system in response to a kick control signal 714 from the completer 760 through control/interface 710. The kick control signal 714 opens and closes the pneumatic valve 730 causing pancake air cylinder 130 to expand, thereby driving strut assembly 118A–118C upward in a vertical direction momentarily. A typical burst of 80 PSI is provided to the air cylinder 130 from air supply 720 by airflow 722. This "bump" is transferred to upper chassis 120 (not shown in FIG. 7; see FIGS. 1A, 1B, and 2). Such feedback is useful in applications such as computer games and/or entertainment systems where the "bump" provides information utilizing physical signals or cues to a user. The air cylinder 130 may incorporate internal cushions for absorbing the jar of the "bump." For instance, the present invention may be used to operate a vehicle in a computer game, so that a "bump" is provided to the system if the user-controlled vehicle collides with an object in the game. This provides an added dimension of realism to the computer game. It should be obvious to a person skilled in the art that the present invention has further applications and, therefore, the foregoing example is simply illustrative.

The control panel 710 operates the valves 730 and 732 using kick and fill control signals 714–712, respectively. The weight and pressure sensor signal 194 is provided to control interface 710 from the linear transducers of air cylinder 130. User-detection sensors are incorporated in the system to detect when a user is on upper platform 180. In the preferred embodiment, infrared (IR) sensors are mounted upon steering mechanism 182 to detect when a user grasps it. The IR sensor signals are provided to controller 710. When a user is detected, the controller 710 retracts the stabilizing air cylinders 192A–192D in response to the IR sensor signals. Similarly, the linear transducers of air cylinder 130 may be used to detect the presence of a user. The weight and pressure signal 194 is provided to control interface 710 to indicate the presence of a user. In response, control interface 710 provides fill control signal 712 to fill valve 732 causing the air cylinders 192A–192D to retract.

Once the user is loaded onto upper platform 180, the stabilizing air cylinders 192A–192D are retracted in response to fill control signal 712 as described above. With air cylinders 192A–192D retracted, upper platform 180 is able to pivot from its reference plane in 360°. The universal joint 170 (shown in FIG. 1A) connected to upper platform 180 allows upper platform 180 to tilt, or pivot, smoothly from its reference plane through 360° about strut 172 of the upper chassis 120. FIG. 3 illustrates the reference coordinate system for X- and Y-position signals 198–196 generated by the system. The X-Y coordinate system indicates that Y values increase positively in the longitudinal direction of chassis 110–120 (shown in FIG. 1A) away from struts 114A–114B. Accordingly, X values increase positively in the lateral direction of the chassis 110 toward frame 110A. The Y- and X-position signals 196–198 produced by linear transducers 162A–162B are provided to control interface 710. Linear transducers 162A–162B measure linear compression and/or extension of the corresponding transducer arm. Control interface 710 transmits position signals 196–198 to computer 760 or a remote apparatus through communication link 750.

FIG. 6A is a side-view of the present invention, similar to FIG. 1B, wherein the diagram has been simplified to illustrate user input to produce position signals 196–198. The X-axis is represented by a point enclosed within a circle to indicate that it is increasing positively out of the drawing. The Y-axis increases positively toward the right from the concentric, longitudinal axis of strut 172. A user leaning forward on steering mechanism 182 in the positive Y-direction displaces upper platform 180 from its reference plane. For purposes of illustration, input motion is shown along the Y-axis only. This input motion compresses linear position transducer 162A and extends hydraulic damper 160A by an equal distance $\Delta Z$. In FIG. 6A, a maximum displacement $\Delta Z$ is input causing the lower surface of upper platform 180 to impinge upon bump-stop air cylinder 192C. Linear position transducer 162A detects the displacement $\Delta Z$ from the reference level when in the stabilized state (air cylinders 192A–192D in the up position) of the upper platform 180. In FIG. 6A, linear transducer 162A measures a positive displacement $\Delta Z$, thereby producing a positive Y-position signal 196.

FIG. 6B is a front-view of the present invention analogous to FIG. 6A. The Y-axis is represented by a point enclosed within a circle to indicate that it is increasing positively out of the drawing. The X-axis increases positively toward the left from the concentric, longitudinal axis of strut 172. User input motion displaces upper platform 180 from its reference plane toward the right in the negative Y-direction. For purposes of illustration, input motion is shown along the X-axis only. This input motion compresses linear position transducer 162A and extends hydraulic damper 160B by an equal distance $\Delta Z$. In FIG. 6B, a maximum displacement $\Delta Z$ is input causing the lower surface of upper platform 180 to impinge upon bump-stop air cylinder 192D. Linear position transducer 162B detects the displacement $\Delta Z$ from the reference level when in the stabilized state (air cylinders 192A-192D in the up position) of the upper platform 180. In FIG. 6B, linear transducer 162B measures a positive displacement $\Delta Z$, thereby producing a positive X-position signal 198.

The system measures user motion input in 360° comprising orthogonal X- and Y-components, and, therefore, is not limited to determining input along a single axis. For example, user input motion that displaces upper platform 180 from a reference state at 45° angle with respect to the reference coordinate system produces a combination of Y- and X-position signals 196-198 having equal values. That is to say that positive, equal values along the X- and Y-axes represent motion in a diagonal direction of 45°. Thus, user inputs having direction in 360° are measured by linear transducers 162A-162B, thereby producing corresponding Y- and X-position signals 196-198, respectively.

Thus, an apparatus for producing position signals in direct response to induced pivoting motion of the apparatus by an essentially erect or standing human upon the apparatus is disclosed.

We claim:

1. An apparatus for providing position signals comprising:
    circular contact means for receiving user motions;
    pneumatic suspension means coupled to said contact means for supporting said contact means;
    a base coupled to said pneumatic suspension means;
    an upper chassis coupled to said base;
    pivoting means centrally coupled to said circular contact means for allowing pivotal motion of said contact means, said pivoting means coupled to said upper chassis;
    damping means coupled to said circular contact means and to said upper chassis;
    transducing means coupled to said contact means and to said base for providing position signals, said transducing means responsive to said contact means;
    a lower chassis coupled to a first side of said upper chassis;
    an air cylinder centrally coupled to said upper chassis and to lower chassis for allowing vertical displacement of said upper chassis.

2. The apparatus of claim 1 wherein said pneumatic suspension means comprises a tubular air spring.

3. The apparatus of claim 1 wherein said transducing means comprises a plurality of potentiometers, each potentiometer of said plurality of potentiometers having a variable resistance responsive to said pivotal motion of said contact means.

4. The apparatus of claim 1 wherein said contact means includes a fixture perpendicularly disposed to a surface of said contact means for providing pivotal and translational motion.

5. The apparatus of claim 1 wherein said air cylinder receives a feedback signal for providing vertical motion responsive to said position signals.

6. The apparatus of claim 1 wherein said pneumatic suspension means comprises damping means.

7. The apparatus of claim 1 further including stopping means coupled to said base for locking said contact means.

8. The apparatus of claim 1 wherein said pneumatic suspension means comprises a U-joint pivot coupled to said contact means and to said upper chassis for allowing translational and said pivotal motion of said contact means.

9. The apparatus of claim 1 wherein compliant pivotal means couples said upper chassis to said lower chassis.

10. The apparatus of claim 1 wherein said air cylinder provides a sensor signal indicating a weight of a user.

11. An apparatus for providing position signals comprising:
    contact means for receiving user motions;
    suspension means coupled to said contact means for allowing pivotal motion of said contact means;
    transducing means coupled to said contact means for providing position signals, said transducing means responsive to said contact means, said transducing means comprises a plurality of potentiometers, each potentiometer of said plurality of potentiometers having a variable resistance responsive to said pivotal motion of said contact means; and
    a chassis coupled to said suspension means.

12. The apparatus of claim 11 wherein said suspension means comprises a universal joint for allowing said contact means to rotate in 360°.

13. The apparatus of claim 11 wherein said suspension means comprises a tubular air spring for providing continuous suspension of said contact means in response to motion of said contact means.

14. The apparatus of claim 11 wherein said contact means includes a fixture perpendicularly disposed to a surface of said contact means for providing pivotal motion.

15. The apparatus of claim 11 wherein said suspension means comprises damping means for providing continuous damping in response to motion of said contact means.

16. The apparatus of claim 11 wherein said suspension means comprises stopping means for stabilizing said contact means in a reference state.

17. The apparatus of claim 11 wherein said chassis comprises an upper and lower chassis.

18. The apparatus of claim 17 further comprising compliant pivotal means for coupling said upper chassis to said lower chassis, said compliant pivotal means for providing rotation of said upper chassis.

19. The apparatus of claim 18 comprising an air cylinder coupled between said upper chassis and said lower chassis for vertically displacing said upper chassis.

20. The apparatus of claim 19 wherein said air cylinder provides a sensor signal indicating a weight of a user.

* * * * *